United States Patent
Pereira et al.

(10) Patent No.: US 9,237,490 B2
(45) Date of Patent: Jan. 12, 2016

(54) WIRELESS COMMUNICATION SYSTEM UTILIZING STAGGERED DEVICE HANDOVERS

(71) Applicant: Broadcom Corporation, Irvine, CA (US)

(72) Inventors: Stephanie Pereira, Santa Clara, CA (US); Leena Zacharias, San Jose, CA (US); Pavan Nuggehalli, Mountain View, CA (US); Shao-Cheng Wang, Santa Clara, CA (US); Soumen Chakraborty, Bangalore (IN); Sindhu Verma, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 145 days.

(21) Appl. No.: 14/166,709

(22) Filed: Jan. 28, 2014

(65) Prior Publication Data

US 2014/0211757 A1 Jul. 31, 2014

Related U.S. Application Data

(60) Provisional application No. 61/804,473, filed on Mar. 22, 2013, provisional application No. 61/758,553, filed on Jan. 30, 2013.

(51) Int. Cl.
*H04W 36/12* (2009.01)
*H04W 36/00* (2009.01)
*H04W 76/04* (2009.01)

(52) U.S. Cl.
CPC .......... *H04W 36/0055* (2013.01); *H04W 36/12* (2013.01); *H04W 76/046* (2013.01)

(58) Field of Classification Search
CPC ... H04W 36/12; H04W 3/0055; H04W 48/12; H04W 76/046; H04W 68/00
USPC ............................ 370/329–338; 455/435, 509
See application file for complete search history.

(56) References Cited

U.S. PATENT DOCUMENTS

| | | | | |
|---|---|---|---|---|
| 6,016,428 | A * | 1/2000 | Diachina et al. | 455/435.1 |
| 8,811,350 | B2 * | 8/2014 | Chung et al. | 370/332 |
| 9,036,599 | B2 * | 5/2015 | Chin et al. | 370/331 |
| 2013/0201841 | A1 * | 8/2013 | Zhang et al. | 370/252 |
| 2013/0215772 | A1 * | 8/2013 | Kaur et al. | 370/252 |
| 2013/0235814 | A1 * | 9/2013 | Wietfeldt et al. | 370/329 |
| 2014/0050146 | A1 * | 2/2014 | Chrisikos et al. | 370/328 |
| 2014/0128069 | A1 * | 5/2014 | Xing et al. | 455/435.1 |
| 2015/0057011 | A1 * | 2/2015 | Di Girolamo et al. | 455/454 |
| 2015/0223028 | A1 * | 8/2015 | Wang et al. | 370/329 |

FOREIGN PATENT DOCUMENTS

GB 2488512 A * 9/2012 ............ H04W 72/04

* cited by examiner

*Primary Examiner* — Afsar M Qureshi
(74) *Attorney, Agent, or Firm* — Sterne, Kessler, Goldstein & Fox PLLC

(57) ABSTRACT

Carrier aggregation and dual connectivity allow a user device to communicate with one or more base stations on multiple component carrier frequencies. When it is determined that the user device should handover to a new base station, the user device performs a substantial portion of the needed handover operations with the new base station using only one of the component carrier frequencies. Meanwhile, the user device maintains data communications with the original base station on the remaining component carrier frequencies.

20 Claims, 7 Drawing Sheets

WIRELESS COMMUNICATION SYSTEM UTILIZING STAGGERED DEVICE HANDOVERS

CROSS-REFERENCED TO RELATED APPLICATIONS

This patent application claims the benefit of U.S. Provisional Patent Application No. 61/804,473, filed Mar. 22, 2013, entitled "Wireless Communication System Utilizing Enhanced Air-Interface," and U.S. Provisional Patent Application No. 61/758,553, filed Jan. 30, 2013, entitled "Wireless Communication System Utilizing Enhanced Air-Interface," both of which are incorporated herein by reference in their entirety.

BACKGROUND

1. Technical Field

This disclosure relates performing handovers of multi-carrier devices in a wireless communication environment.

2. Related Art

Wireless communication devices, such as cellular telephones to provide an example, have become commonplace in both personal and commercial settings. The wireless communication devices provide users with access to all kinds of information. For example, a user can access the Internet through an Internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

In wireless communication environments, some user devices have the capability to communicate with a serving base station over multiple carrier frequencies. This is referred to as "carrier aggregation" and involves the user device tuning two or more radios to different frequencies for communicating with the same base station. Conventionally, when the user device begins a handover process to a target base station, the user device stops communication with the source base station on all of its radios, and then uses the primary radio to perform synchronization with the target base station.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 1:
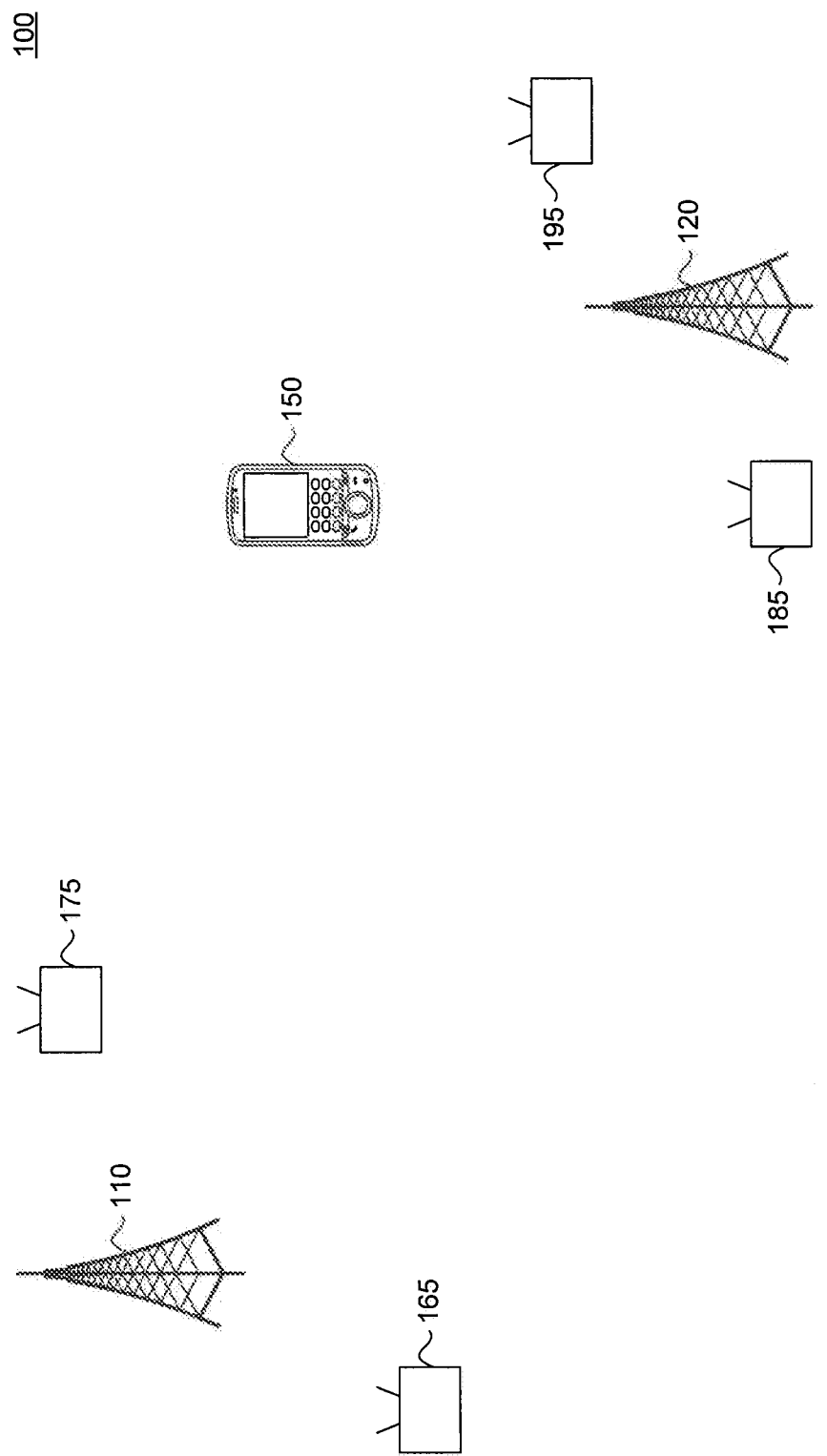
FIG. 1 illustrates a diagram of an exemplary wireless communication environment.

The disclosure will now be described with reference to the accompanying drawings.

DETAILED DESCRIPTION

The following Detailed Description of the present disclosure refers to the accompanying drawings that illustrate exemplary embodiments consistent with this disclosure. The exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, the term "module" and the like, shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms may be utilized interchangeably in the subject specification and related drawings. Likewise, the terms "access point," "base station," "base transceiver station", "Node B." "evolved Node B (eNode B)," home Node B (HNB)," "home access point (HAP)," or the like, may be utilized interchangeably in the subject specification and drawings, and refer to a wireless network component or apparatus that serves and receives data, control, voice, video, sound, gaming, or substantially any data-stream or signaling-stream from a set of subscriber stations.

Although several portions of the description of the present disclosure may be described in terms of wireless devices (specifically cellular devices), those skilled in the relevant art(s) will recognize that the present disclosure may be applicable to any other devices without departing from the spirit and scope of the present disclosure.

An Exemplary Wireless Communication Environment

FIG. 1 illustrates an exemplary wireless communication environment 100. In the environment 100, there may be included one or more base stations, such as base stations 110 and 120. Although the base stations may be termed differently in the art depending on their corresponding radio access technology (e.g., eNodeB for 4G, etc.), for purposes of this disclosure they will collectively be referred to as "base stations." In addition to the base stations, the environment 100 may also include one or more WLAN access points, such as access points 165, 175, 185 and 195.

In the environment 100, a user equipment (UE) 150 connects to one of the base stations (e.g., base station 120). Conventionally, while the UE 150 is connected to the base station 120, the UE will continuously measure connection characteristics of the serving base station 120, as well as other nearby base stations (e.g., base station 110). The UE 150 forwards these measured characteristics to the serving base station 120, which makes a determination as to whether to handover the UE 150 to another base station, such as base station 110.

Today's wireless communication devices (e.g., UEs) have the ability to access the interne, stream video and music, and other such activities that can require significant bandwidth and throughput. Therefore, carrier aggregation has been devised, which allows the user device to communicate with a serving bases station over multiple carrier frequencies. This provides multiple data streams between the user device and the base station, thereby increasing both bandwidth and throughput. Carrier aggregation is defined in the 3GPP LTE-Advanced specification (TS 36.300, Overall Description; Stage 2), which is incorporated herein by reference in its entirety.

As defined in the 3GPP specification, one of the carriers is referred to as the primary component carrier (PCC), and can be used for both data and control communications. All other carriers (e.g., there can be one to several others) are referred to as secondary component carriers (SCCs), and are used primarily for data communication.

In the conventional offloading solutions, a determination is made by either the UE or the serving base station to handover the UE to a target base station. Once the determination to handover has been made, the PCC is tuned to an available frequency of the target base station. Conventionally, at this time, data communications with the source base station are halted across all UE carriers, including both the PCC and all SCCs. The PCC then proceeds to exchange synchronization and other information with the target base station.

Once sufficient information has been exchanged with the target base station, the UE will receive connection parameters from the target base station over the PCC, which will allow the UE to reconfigure its radios for connection with the target base station. After reconfiguration, the PCC (and the SCCs, assuming carrier aggregation is available at the target base station) will complete the handover and begin data communication with the target base station.

As described above, although the bulk of the actual handover exchange occurs on the PCC, the UE halts communications on all SCCs while the handover is taking place. Thus, the conventional handover wastes significant bandwidth and throughput that is otherwise available on the unused SCCs, and causes unnecessary latency. Therefore, as described in further detail herein, a staggered handover can be used to allow the SCCs to maintain communication with the source base station, even while the PCC performs synchronization and other handover procedures with the target base station.

Figure 2:
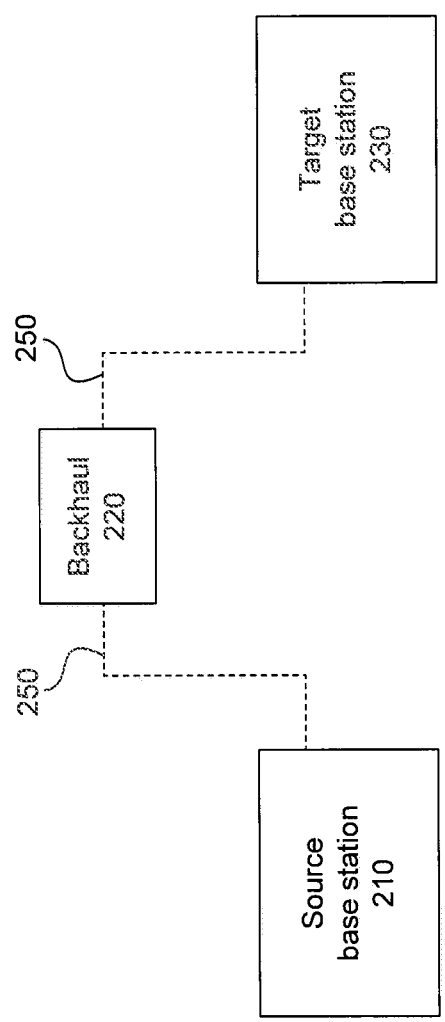
FIG. 2 illustrates a block diagram of an exemplary base station configuration within the exemplary wireless communication environment.

FIG. 2 illustrates a block diagram of an exemplary source base station 210 and target base station 230. In an embodiment, the source base station 210 and the target base station 230 are connected by a backhaul 220. The backhaul 220 can perform coordinated control of the source base station 210 and the target base station 230, and/or represent a communication link between the source base station 210 and the target base station 230. In this configuration, the source base station 210 can communicate important handover information to the target base station 230, such as notifying the target base station 230 of the staggered handover described herein.

Exemplary Base Station

Figure 3:
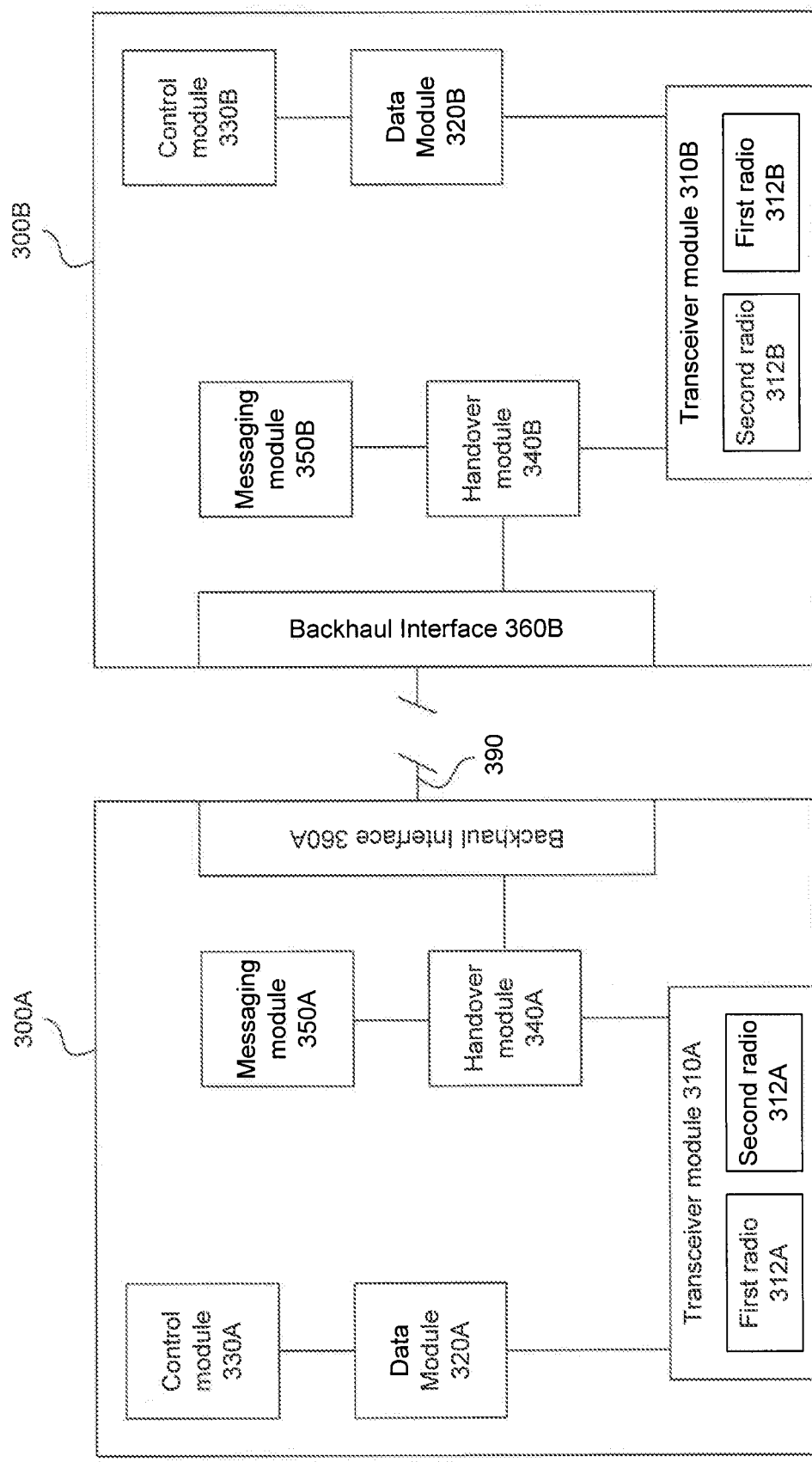
FIG. 3 illustrates a block diagram of an exemplary source base station and target base station.

FIG. 3 illustrates a block diagram of an exemplary source base station 300A and target base station 300B. The source base station 300A and the target base station 300B are described differently herein based on their respective roles within a handover procedure from the source base station 300A to the target base station 300B. However, it should be understood that each of the source base station 300A and the target base station 300B can have substantially the same structural and functional attributes configurations, so as to allow each to initiate and receive the handover.

The base stations 300 each have a transceiver module 310 that includes at least a first radio 312 and a second radio 314, a data module 320, a control module 330, a handover module 340, a messaging module 350, and a backhaul interface 360. In operation, the transceiver module 310 communicates with one or more user devices in the wireless communication environment. For example, the transceiver module 310 communicates with a user device over the PCC using the first radio 312, and communicates with the user device over the SCC using the second radio 314. In an embodiment, the base stations 300 can include more than two radios for communicating over the same or different frequencies as the first radio 312 and the second radio 314. All or some of the modules of base stations 300 can be implemented using one or more processor(s) and/or state machine logic and/or circuits, or a combination thereof, programmed or implemented to have the functionality described herein. Although separate modules are illustrated in FIG. 3, the disclosure is not so limited, as will be understood by those skilled in the arts. The modules can be combined in one or more modules, and can be implemented by software, hardware, or a combination thereof.

The data module 320 sends and receives data to/from the user device for providing telephone, interne, and other data services to the user device. When in normal carrier aggregation mode, the data module 320 receives multiple data input streams from the user device, including one on the PCC via the first radio 312, and one on each of the SCCs via the second radio(s) 314. In an embodiment, the data module 320 can treat these multiple data input streams as independent. Alternatively, the data module 320 can treat the multiple data input streams as a single stream, in which case the data module 320 intelligently combines them according to a predefined process. In similar manners, the data module 320 also prepares and sends multiple output data streams to the user device via the first radio 312 and second radio 314.

As part of most communication standards, control information must accompany the data being exchanged between the base station 300 and the user device. In an embodiment, control information is required for each component carrier. In other words, the PCC and each of the SCCs must have their own control information to assist each with exchanging data with the base station 300. Therefore, the control module 330 receives control information from the user device, and generates control information for transmitting to the user device, for each of the active component carriers. In an embodiment, the control information for each of the PCC and all SCCs is transmitted on the PCC during normal carrier aggregation mode.

The handover module 340 performs several operations relating to the handover, which will be discussed in further detail herein. Such operations include making the initial handover determination, coordinating with the other base station, and performing reconfiguration timing calculations, among others. The messaging module 350 prepares messages relating to the handover for transmission to the other base station involved in the handover and/or the user device, as well as receives and deciphers messages from the user device and the other base station. The backhaul interface 360 provides a communication interface to the X2 backhaul for allowing the base stations 300 to communicate with each other. The various configurations and functions of the above-described elements will be described in further detail below as they relate to performing a staggered handover.

Exemplary User Equipment

Figure 4:
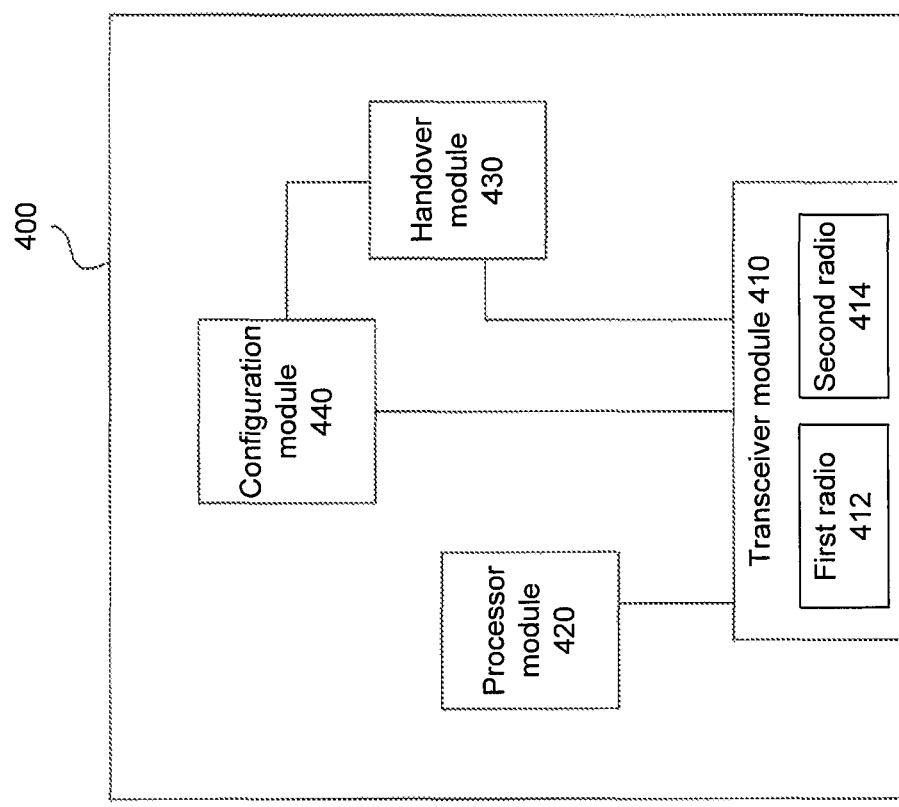
FIG. 4 illustrates a block diagram of an exemplary user equipment.

FIG. 4 illustrates a block diagram of an exemplary user equipment 400 (UE, also referred to as "user device"). The UE 400 includes a transceiver module 410 having a first radio 412 and a second radio 414, a processor module 420, a handover module 430, and a configuration module 440. All or some of the modules of UE 400 can be implemented using one or more processor(s) and/or state machine logic and/or circuits, or a combination thereof, programmed or implemented to have the functionality described herein. Although separate modules are illustrated in FIG. 4, the disclosure is not so limited, as will be understood by those skilled in the arts. The modules can be combined in one or more modules, and can be implemented by software, hardware, or a combination thereof.

The transceiver module 410 transmits signals to, and receives information from, one or more base stations in the wireless communication environment 100. The first radio 412 can be configured to communicate on a first frequency, and the second radio can be configured to communicate on a second frequency. In this manner, the transceiver module 410 can communicate with one or more base stations over multiple data streams. The processor module 420 is configured to process the data and control information received from the base stations, as well as prepare data and control information for transmission to the base stations.

The handover module 430 performs various operations relating to handing over from a source base station to a target base station. Such operations can include deciphering and transmitting messages and performing synchronization, among others. Also involved in the handing over, the configuration module 440 is able to reconfigure the first radio 412 and the second radio 414, including tuning the radio to new frequencies to implement the handover to the target base station from the current serving base station. The elements of the UE 400, and their respective functions, are discussed in further detail below.

Exemplary Handover

An exemplary handover will now be described with reference to FIGS. 3 and 4. For purposes of this discussion, it will be assumed that base station 300A is the source base station from which the UE 400 is handing over, and that the base station 300B is the target base station to which the UE 400 is handing over. Also, although only a single SCC will be described in this discussion, it should be understood that there can be any number of second radios 314 and 414 that are capable of communicating over a same number of SCCs that function in the same manner as the SCC described in this section.

Prior to initiating a handover (normal mode), the UE 400 communicates with the source base station 300A. Due to carrier aggregation, the first radio 412 of the UE 400 communicates with the first radio 312 of the source base station 300A over the PCC, and the second radio 414 communicates with the second radio 314 of the source base station 300A over the SCC. As part of this communication, the UE 400 and the source base station 300A exchange data, control information, and other information needed to maintain communication. In an embodiment, only data is exchanged over the SCC during normal mode communication, and all control information and acknowledgements/non-acknowledgements (ACK/NACKs) for both the PCC and SCC are exchanged over the PCC. Specifically, control information from a base station (including communication grants) is conventionally sent on the Physical Downlink Control Channel (PDCCH). However, if cross-carrier scheduling is enabled, then it is possible for the PCC to carry the PDCCH for an SCC. Therefore, scheduling grants for SCC resources can be transmitted on the PCC.

Occasionally, the UE 400 performs measurements of the source base station 300 and/or nearby base stations, and transmits this measurement data to the source base station 300A. In an embodiment, the measurement information includes measurement data of the target base station 300B. The base station 300A receives the measurement data at the handover module 340A. The handover module 340A performs various calculations based on the received measurement data to determine whether the UE 400 should hand over, in this case to the target base station.

Once the handover module 340A determines that the UE 400 should hand over to the target base station, the handover module 340A stops providing PCC grants to the UE (in anticipation of acceptance of the handover) and requests the handover from the messaging module 350A. The messaging module 350A generates and transmits a "Staggered Handover Request" to the target base station 300B over the backhaul 390 via the backhaul interface 360A. The Staggered Handover Request is unique in that it requests the target base station to authorize and configure for a staggered handover.

The staggered handover is different from the conventional, and requires tailored functionality by the parties involved in order to execute successfully. Therefore, the Staggered Handover Request also places the target base station 300B on notice of the type of handover being requested so that the target base station 300B can properly configure itself for the handover. In an embodiment, the Staggered Handover Request can include a flag identifying the requested handover as being a staggered handover. In an embodiment, the source base station 300A informs the target base station 300B of the reconfiguration time of the UE so that the target base station 300B knows when to grant resources to the UE 400 to send a RRCReconfigurationComplete message. (Herein, standards related messages including Long Term Evolution (LTE) related messages, are italicized, for ease of understanding.)

In an embodiment, rather than stopping PCC grants to the UE in anticipation of handover acceptance, the control module 330A of the source base station 300A can continue sending PCC grants to the user device until the handover acceptance is received. In other words, while the source base station 300A is requesting the staggered handover and awaiting the response from the target base station 300B, the control module 330A continues to transmit data grants to the UE 400 so as to allow the UE 400 to continue communications with the source base station 300A over both the PCC and SCC. Therefore, during this time, the UE 400 maintains normal mode communication on both the PCC and the SCC.

Meanwhile, the handover module 340B of the target base station 300B receives the Staggered Handover Request. The handover module 340B then determines whether to accept the request. The handover module 340B may factor the current number of subscribers, available bandwidth, and its abilities to perform staggered handovers, among other factors when determining whether to accept the request. In an embodiment, if the handover module 340B determines that the target base station 300B is unable to perform a staggered handover, rather than responding with a simple accept/reject message, the messaging module 350B may transmit a "conditional accept" message that suggests handing over using traditional handover procedures. In this scenario, the source base station 300 can cause the UE 400 to initiate a traditional handover as has been described above.

If the handover module 340B determines to accept the staggered handover request, the messaging module 350B transmits an "accept" message to the source base station 300B over the backhaul 390 via its backhaul interface 360B. In an embodiment, the accept message can include the content for an RRCConnectionReconfiguration message to be forwarded to the UE 400. The RRCConnectionReconfiguration message can include a flag or other identifying information to inform the UE 400 that the handover will be staggered. At this point in the conventional handover procedure, the source base station 300A would have stopped all communication grants to the UE 400, whether on the PCC or SCC and forwards data and status information to the target base station 300B via the backhaul interface 360A for use at the completion of the handover. However, with the staggered handover procedure, the source base station 300A does not completely stop communication grants, nor does the source base station 300A forward the data and status information to the target base station 300B at this time.

Instead, after receiving the accept message from the target base station 300B, the source base station 300A transmits the RRCConnectionReconfiguration message with Mobility-ControlInformation to the UE 400 to initiate hand over, and stops communication grants to the PCC only. Specifically, although control information from a LIE is sent on the Physical Uplink Control Channel (PUCCH), which is located on the PCC, it is also possible to send this control information via the Physical Uplink Shared Channel (PUSCH) on the SCCs. Therefore, in preparation for the handover, the source base station 300A begins allocating resources to exchange the control information on the PUSCH of the SCC.

After the source base station 300A transmits the RRCConnectionReconfiguration message, the data module 320A continues to exchange data communications with the UE 400 on the SCC via the second radios 314A/414. In addition, although the control module 330A may have been exchanging SCC control information to the UE 400 over the PCC during normal mode, during this handover mode the control module 330A transitions to exchanging the SCC control information over the SCC.

In addition, in an embodiment, there may remain PCC control information for exchange after the transmission of the RRCConnectionReconfiguration message. This can result when the RRCConnectionReconfiguration message is received by the UE 400 in the middle of a communication grant. Specifically, base stations allocate time periods for which a subscribing device can transmit data (e.g., 4 ms in LTE). If the RRCConnectionReconfiguration message is received during the grant, the UE will finish its transmission on the PCC. However, because the PCC switches to handing over following the grant, it will be unable to receive the ACK/NACKs from the source base station, effectively wasting those unacknowledged transmission. Therefore, in an embodiment, the control module 330A may transmit this PCC control information over the SCC via the second radios 314A/414.

Now in handover mode, the UE 400 continues to communicate with the source base station 300A over the SCC via the second radios 314A/414. As discussed above, the source base station 300A and the UE 400 exchange data as well as all control information over the SCC. Meanwhile, the source base station 300A no longer communicates with the UE 400 over the PCC.

Once in handover mode, the UE 400 initiates the handover on the PCC, since there is no longer communication with the source base station on the PCC. Specifically, the first radio 412 of the UE 400 begins exchanging handover information with the target base station 300B. Such information may include synchronization information and a Random Access Channel (RACH) preamble. The target base station 300B receives the handover information on the PCC via its first radio 312B, and forwards the information to the handover module 340B. The handover module 340B performs timing synchronization with the UE 400 using the synchronization information. In addition, upon receipt of the RACH preamble, the handover module 340B notifies the messaging module 350B. Thereafter, the messaging module generates and transmits a "Preamble Received" message to the source base station 300A on the backhaul 390 via the backhaul interface 360B.

This message, unique to this staggered handover procedure, provides a baseline with which the source base station 300A can determine when to stop providing access grants to the UE 400 for the SCC, so that communication between the source base station 300A and the UE 400 stops before reception of a RandomAccessResponse (RAR) message. To achieve this, handover module 340A of the source base station 300A receives the Preamble Received message from the backhaul 390 via the backhaul interface 360A. Upon receiving the Preamble Received message from the target base station 300B, the handover module 340A of the source base station 300A estimates the earliest time at which the target base station 300B will send a the RandomAccessResponse (RAR) message to the UE 400. The source base station 300A stops providing communication grants to the UE 400 before the RAR is received.

Using the estimated time to the RAR message, the source base station 300B continues to transmit SCC communication grants to the UE 400 up until at least one grant length prior to the estimated time. In further detail, the control module 330A receives the estimated time and calculates a StopGrant time, which will define the last point at which the control module 330A will transmit a communication grant to the UE 400. This StopGrant time can be defined as the difference between the estimated time ($T_{est}$) and the size of a communication grant ($T_{grant}$):

$$StopGrant = T_{est} - T_{grant} \quad (1)$$

The control module 330A then continues to schedule and transmit communication grants to the UE 400 via the second radio 314 over the SCC until the StopGrant time has been reached. In other words, the control module 330A stops sending communications when:

$$t \geq StopGrant. \quad (2)$$

Once equation (2) is satisfied, the control module 330A stops transmitting communication grants to the UE 400. Once the UE 400 is no longer receiving SCC communication grants, the UE 400 stops transmitting data over the SCC. Therefore, neither the first radio 412 nor the second radio 414. If timed correctly, the handover module 340B of the target base station 300B will complete synchronization with the UE 400 shortly after the UE 400 has halted communications with the source base station 300A. Once synchronization is complete, the handover module 340B notifies the messaging module 350B, which transmits the RAR message to the UE 400 on the PCC via the first radio 312B.

The handover module 430 of the UE 400 receives the RAR message via the first radio 412 over the PCC. The handover module 430 notifies the configuration module 440, which then reconfigures the first radio 412 and the second radio 414. Once the configuration module 440 has completed the reconfiguration of the first radio 412 and the second radio 414, the handover module 430 transmits an RRCConnectionReconfigurationComplete message to the target base station 300B over the PCC via the first radio 412.

In addition, any time after the source base station 300A has stopped providing communication grants to the UE 400, but preferably before the UE 400 transmits the RRCConnectionReconfigurationComplete message, the handover module 340A forwards data and associated sequence number (SN) status information to the target base station 300B over the backhaul 390. This information will be used by the target base station 300B with the UE 400 after the handover has completed. For example, the data can include data queued that the source base station 300A had received from the UE 400, which it had not yet processed, or data that was designated for the UE 400, which had not yet been sent. The SN status can provide the sequence number of the last data frame transmitted to and/or received from the UE 400. This allows the target base station 300B to pick up communications with the UE 400 from where they were suspended with the source base station 300A.

In an embodiment, the UE 400 may require a communication grant from the target base station 300B in order to transmit the RRCConnectionReconfigurationComplete message. In order to time the communication grant, the handover module 340A of the source base station 300A can include a reconfiguration time of the UE 400 in the Staggered Handover Request message that its sends to the target base station 300B. The reconfiguration time provides an estimate of the time it will take for the UE 400 to reconfigure its radios 412/414. With this information, the target base station 300B can determine when to send the UE 400 communication grants based on the time of sending the RAR message. For example, the target base station can begin sending communication grants at $T_{startgrant} = T_{RAR} + T_{reconf}$, where $T_{RAR}$ is the time of sending the RAR message and $T_{reconf}$ is the reconfiguration time received from the source base station 300A.

Once the UE 400 transmits the RRCConnectionReconfigurationComplete message, and it is received by the target base station 300B, normal mode communication can resume on the target base station 300B.

Exemplary Handover Method

Figure 5A:
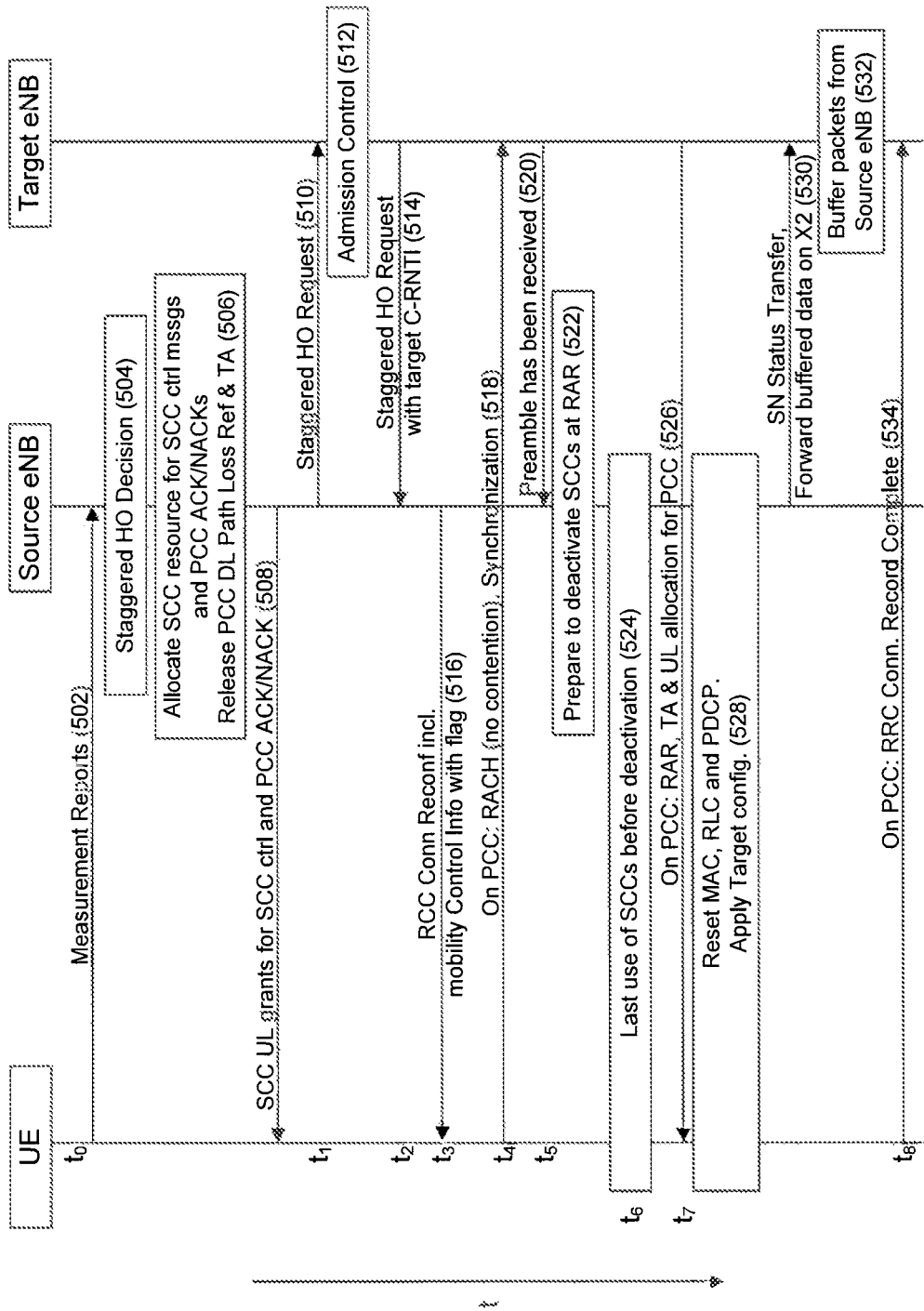
FIG. 5A illustrates a call flow diagram of an exemplary handover procedure according to an embodiment.
Figure 5B:
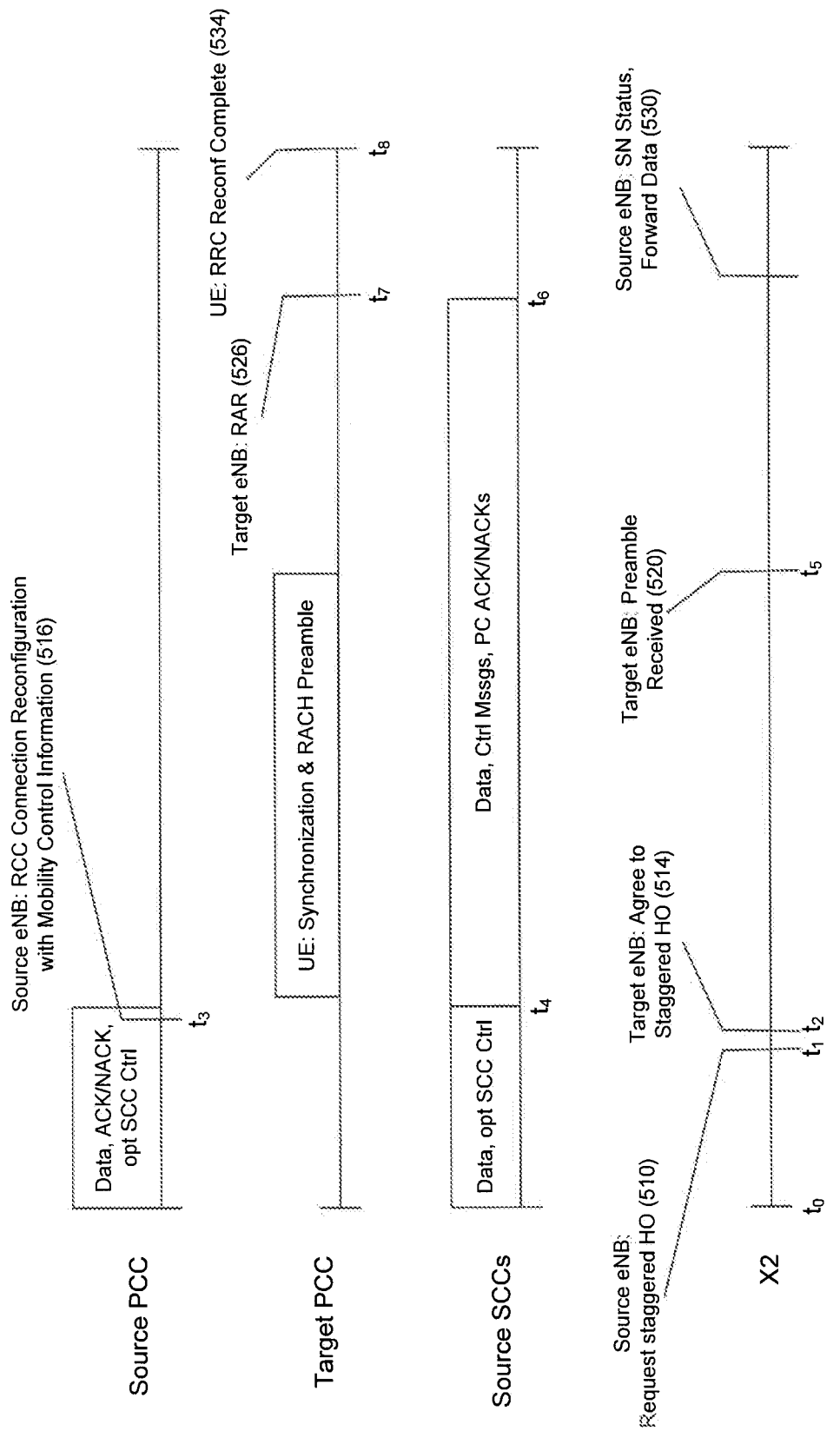
FIG. 5B illustrates a communication flow diagram of the exemplary handover procedure according to an embodiment.

FIG. 5A illustrates a call flow diagram of an exemplary handover procedure according to an embodiment, and FIG. 5B illustrates a communication flow diagram of the exemplary handover procedure according to an embodiment. The call flow diagram of FIG. 5A illustrates the messages and operations that occur between the UE, the source base station (labeled "source eNB"), and the target base station (labeled "target eNB") with time located on the vertical axis and proceeding from top to bottom. Meanwhile, the communication flow diagram in FIG. 5B illustrates the communications that occur on each of the source PCC (e.g., the PCC between the UE and the source base station), the target PCC (e.g., the PCC between the UE and the target base station), the source SCC (e.g., the SCC between the UE and the source base station), and backhaul (e.g., an X2 interface, in an embodiment), where time proceeds left to right on the horizontal axis. The exemplary handover method will be now be described with reference to these FIGS. 5A-5B.

At time $t_0$, the UE is communicating with the source base station in normal mode. As shown in FIG. 5B, during the normal mode, the UE exchanges data over both the source PCC and the source SCC. The UE also exchanges PCC and SCC control information over the source PCC, including ACK/NACK for data sent over the source PCC and the source SCC. As discussed above, in an embodiment, the UE can exchange the SCC control information over the source SCC.

As shown in FIG. 5A, during this normal mode, the UE transmits a measurement report (502) to the source base station. The source base station determines, based on the measurement report, that a staggered handover should be performed (504). After making the handover determination, the source base station allocates resources for the SCC to exchange control information (506), and sends scheduling grants to the UE for the SCC (508). This is done so that the control data for all active carriers can be sent on the SCC after the PCC is deactivated.

After setting up the above configuration, at time $t_1$ the source base station transmits a Staggered Handover Request message (510) to the target base station over a network backhaul. In an embodiment, the source base station includes the Channel Quality Indicator (CQI) of the SCCs, the required Quality of Service (QoS), and the Radio Resource Control (RRC) reconfiguration time of the UE so that the target base station can make an informed decision as to whether to allow the Staggered HO. The target base station receives the Request and performs admission control (512) to determine whether to allow the handover. At time $t_2$, the target base station transmits an Accept message (514) to the source base station when accepting the handover.

After the Accept message is received, the source base station stops providing PCC grants to the UE and, at time $t_3$, transmits the RRCConnectionReconfiguration message with the MobilityControlInformation (516) to the UE to initiate the handover process. As shown in FIG. 5B, shortly after receiving the RRCConnectionReconfiguration message, the UE will run out of grants and stop transmitting on the Source PCC.

At time $t_4$, the UE will enter handover mode. In this handover mode, as shown in FIG. 5B, the UE will maintain data communication on the Source SCC, with all control information also being exchanged on the source SCC. The UE, on the other hand, will stop communicating with the source base station using the PCC and will instead begin performing the handover with the target base station using PCC and the corresponding radio (e.g. 412). For example, referring back to FIG. 5A, the UE transmits its RACH on the target PCC and begins exchanging synchronization information with the target base station (518). The UE will continue to communicate in this manner, with the SCC being used to exchange data with the source base station and the PCC being used to exchange handover information with the target base station, until the PCC has exchanged sufficient handover information with the target base station. Once sufficient handover information has been exchanged, the UE stops using the PCC to communicate with both the source and the target base stations.

At time $t_5$, the target base station transmits a Preamble Received message (520) to the source base station. The source base station then prepares to deactivate the SCCs (522). As discussed above, this preparation can involve estimating when the RAR message will be sent from the target base station to the UE. The source base station will then continue to provide communication grants for the source SCC until the estimated time, at which point the source base station will cease providing communication grants. This will cause the UE, at time $t_6$, to use its last SCC grant before being deactivated (524) from the source base station.

Assuming that the estimation was properly calculated, shortly after the SCC becomes deactivated, at time $t_7$, the target base station transmits the RAR (526) to the UE. In an embodiment, the RAR can be accompanied by an uplink communication grant on the PCC for the UE to transmit the RRCConnectionConfigurationComplete message at the end of reconfiguration. The RAR causes the UE to reconfigure its radios (528) based on the information included within the RRCConnectionReconfiguration message. During this time, the source base station can transmit SN status and buffered data (530) to the target base station on the backhaul. Upon receipt, the target base station will buffer the received data (532) for exchanging with the UE at a later time.

After the UE has finished reconfiguring its radios, at time $t_8$, the UE transmits the RRCConnectionConfiguration-Complete message on the target PCC. This returns the UE to normal mode communication, with target base station, thereby completing the handover.

Extension to Dual Connectivity

Whereas carrier aggregation involves communicating with one base station over multiple component carriers, dual connectivity communicates with multiple base stations using different carriers for different base stations. The above-described staggered handover concepts can be similarly applied to dual connectivity scenarios.

In a dual connectivity scenario, at least some of the benefits of the staggered handover described herein can be achieved for a handover involving fewer than all the component carriers. For example, presume that a UE is communicating with a first base station on the PCC and with a second base station on the SCC. The second base station decides that the SCC should be handed over a third base station. This handover can occur independently of the data flow between the UE and the first base station by applying the principals discussed herein. In particular, data flow continues with the first base station on the PCC, and the SCC performs handover operations in order to transition to communicating with the third base station. The PCC is only deactivated during reconfiguration of the radio, if reconfiguration of the radio requires deactivation of the PCC. When independent radios are used, this may not be necessary.

This idea can be used to mitigate latency. For example, if the first base station is a macro cell, whereas the second and third base stations are small cells, delay insensitive traffic could be sent through the second base station while delay sensitive traffic could always be routed through first base station so that it is not delayed by the handover from the second base station to the third base station. Alternatively, delay sensitive traffic could be sent through the second base station to benefit from the high signal-to-interference-plus-noise ratio (SINR) or data offloading capability of the small cell but rerouted through the first base station before the start of the handover to mitigate latency.

Staggered Handover Impact

In LTE Release 10, the scheduling grant for the UE to send RRCConnectionReconfigurationComplete is sent in the RAR and takes place in at least 6 subframes. In Staggered HO, the UE will start RRC reconfiguration upon RAR reception. The standard requires RRC reconfiguration to take no longer than 15 ms. It is likely that future UEs could complete the reconfiguration in 6 ms or less. This reconfiguration time typically equals the data interruption time for Staggered HO. Very rarely, the interruption time will be longer in cases where RAR reception fails. Failure to receive the RAR would increase data interruption for standard HO in the same way.

Latency is reduced from traditional HO. Traditional HO latency is smallest when synchronization and preamble transmission occur at the same time as RRC reconfiguration. Even compared to this case, the reduction in latency equals $$\max(T_{synch}+T_{preamble}-T_{RRC\ Reconf}, 0), \quad (3)$$

where the 0 occurs in the rare case that synchronization and preamble transmission take less time than RRC reconfiguration. $T_{synch}+T_{preamble}$ can vary between 10 ms to over 100 ms in the case of blind HO. Common values are taken to be 40 ms for non-blind HO and 120 ms for blind HO. $T_{RRC\ Reconf}$ is mandated to be less than 15 ms and is often less than 10 ms. So typically data interruption times are reduced by 30 ms and 110 ms.

Also considered is how much extra data can be sent in Staggered HO. Assume that HO takes 10 ms or 40 ms from transmission of RRCConnectionReconfiguration with MobilityControlInformation to the transmission of the RAR. This is the extra amount of time that can be used to send data in Staggered HO.

There can be from 1 to 4 SCCs sending data. Assume that the SNR at the time of HO is either 5 dB or 15 dB. As an example, the extra data that can be sent for 5 dB and 40 ms transmission duration is obtained as follows:

$$40\ ms * 20\ MHz * \log_2(1+10^{0.5})/8 = 503\ kB. \quad (2)$$

TABLE 1

Extra Data Transmitted For Various Numbers of SCCs, HO Times and TBSs

|  | 1 SCC | 2 SCCs | 3 SCCs | 4 SCCs |
|---|---|---|---|---|
| 40 ms | | | | |
| 15 dB | 503 kB | 1.01 MB | 1.51 MB | 2.01 MB |
| 5 dB | 206 kB | 411 kB | 617 kB | 823 kB |
| 10 ms | | | | |
| 15 dB | 126 kB | 251 kB | 377 kB | 503 kB |
| 5 dB | 51 kB | 103 kB | 154 kB | 206 kB |

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 6:
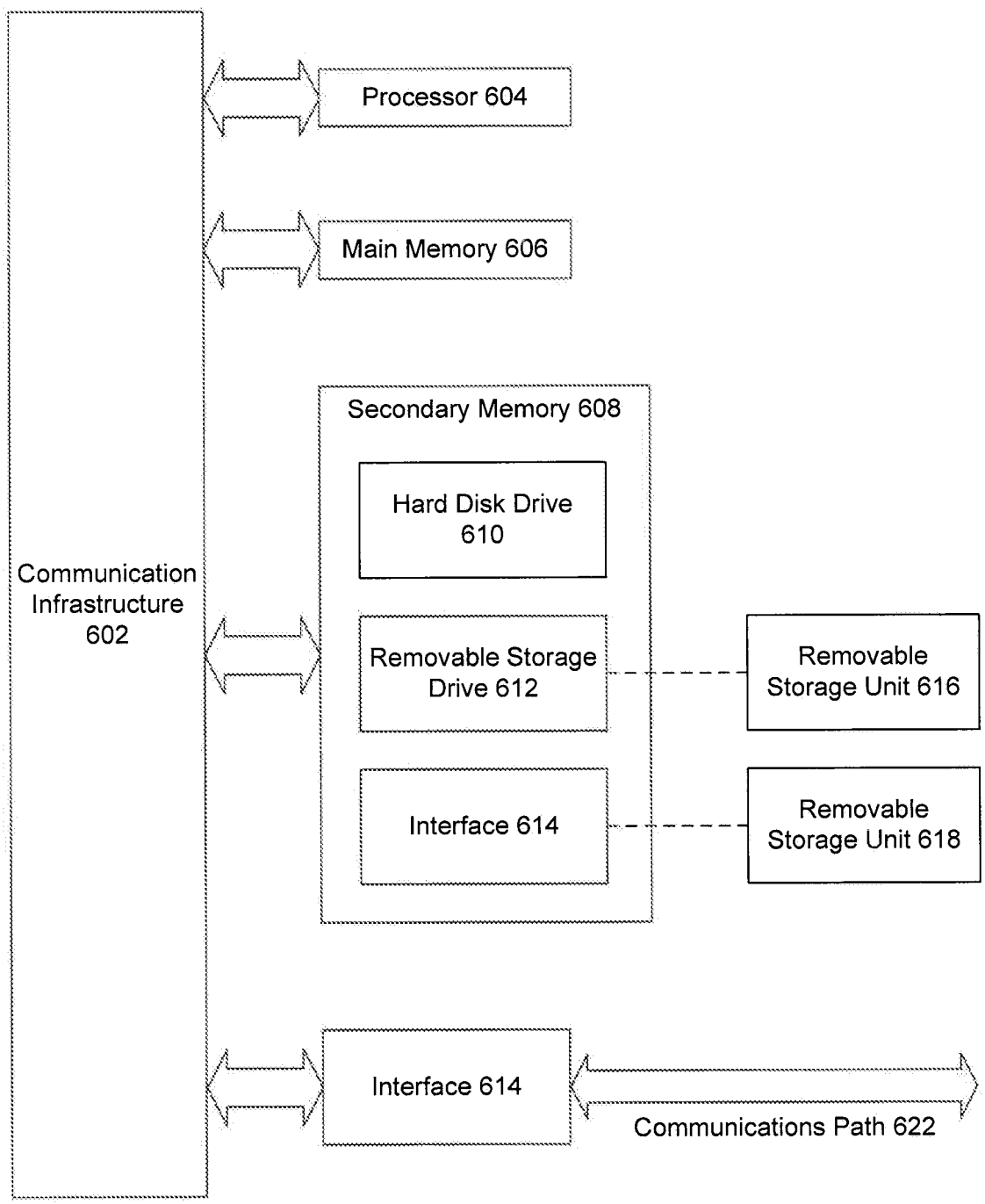
FIG. 6 illustrates a block diagram of a general purpose computer.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 600 is shown in FIG. 6. One or more of the modules depicted in the previous figures can be at least partially implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCMCIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

The exemplary embodiments described herein are provided for illustrative purposes, and are not limiting. Other exemplary embodiments are possible, and modifications may be made to the exemplary embodiments within the spirit and scope of the disclosure.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined in accordance with their recited elements and their equivalents.

What is claimed is:

1. A base station, comprising:
a first radio configured to communicate with a user equipment over a first channel;
a second radio configured to communicate with the user equipment over a second channel; and
a processor and/or one or more circuits, coupled to the first radio and the second radio, configured to:
exchange data with the user equipment over both the first channel and the second channel during a normal operation mode;
analyze the data; and
perform a staggered handover to a target base station based on the data analysis, wherein the processor and/or the one or more circuits is further configured to:
transmit a Staggered Handover Request message to the target base station; and
halt the exchange of data with the user equipment on only the first channel.

2. The base station of claim 1, wherein the processor and/or the one or more circuits is further configured to:
exchange first channel control information and second channel control information with the user equipment over the second channel during the staggered handover.

3. The base station of claim 2, wherein the processor and/or the one or more circuits is further configured to:
exchange the first channel control information and the second channel control information with the user equipment over the first channel during the normal operation mode, outside of the staggered handover.

4. The base station of claim 1, wherein the processor and/or the one or more circuits is further configured to:
receive, as part of the staggered handover, a Preamble Received message from the target base station indicating that the target base station has successfully received a Random Access Channel (RACH) preamble from the user equipment.

5. The base station of claim 4, wherein the Staggered Handover Request message is transmitted, and the Preamble Received message is received, via a system backhaul.

6. The base station of claim 4, wherein the processor and/or the one or more circuits is further configured to:
as part of the staggered handover, estimate a Random Access Response (RAR) Time, based on a time at which the Preamble Received message is received, the RAR Time being indicative of an earliest time at which the target base station will send a RAR message to the user equipment.

7. The base station of claim 6, wherein the processor and/or the one or more circuits is further configured to halt the exchange of data over the second channel with the user equipment at or before the RAR Time.

8. A base station, comprising:
a first radio configured to communicate over a first channel;
a second radio configured to communicate over a second channel; and
a processor and/or one or more circuits, coupled to the first radio and the second radio, configured to:
receive a staggered handover request from a source base station;
transmit a staggered handover acceptance to the source base station;
receive synchronization information and preamble information from a user equipment on the first channel;
transmit, upon receipt of the preamble information, a Preamble Received message to the source base station;
transmit a Random Access Response (RAR) message to the user equipment on the first channel based on the synchronization information and the preamble information; and
after transmitting the RAR message to the user equipment, exchange data with the user equipment on both the first channel and the second channel.

9. The base station of claim 8, wherein the staggered handover request includes a staggered handover flag, and
wherein the staggered handover acceptance includes the staggered handover flag.

10. The base station of claim 8, wherein the staggered handover request includes a reconfiguration time, the reconfiguration time being an estimate of an amount of time the user equipment will need to perform reconfiguration for the staggered handover.

11. The base station of claim 10, wherein the processor and/or the one or more circuits is further configured to calculate an uplink grant time based on the reconfiguration time.

12. The base station of claim 11, wherein the RAR message includes an uplink communication grant designating uplink communication bandwidth to the user equipment for the uplink grant time.

13. The base station of claim 12, wherein the processor and/or the one or more circuits is further configured to receive a completion notification message from the user equipment during the uplink grant time.

14. A user equipment (UE), comprising:
a first radio configured to communicate over a first channel;
a second radio configured to communicate over a second channel; and
a processor and/or one or more circuits, coupled to the first radio and the second radio, configured to:
exchange data with a source base station over both the first channel and the second channel during a normal operation mode;
receive a staggered handover notification from the source base station; and
perform a staggered handover to a target base station based on the staggered handover notification, wherein the processor and/or the one or more circuits is further configured to:
transmit synchronization information and preamble information to the target base station on the first channel;
exchange data with the source base station on the second channel during transmission of the synchronization information and the preamble information;
receive a Random Access Response (RAR) message from the target base station;
reconfigure the first radio according to the RAR message; and
exchange data with the target base station over the first channel after completion the reconfiguration.

15. The UE of claim 14, wherein the processor and/or the one or more circuits is further configured to halt data exchange with the source base station over the first channel prior to transmission of the synchronization information and the preamble information.

16. The UE of claim 14, wherein the processor and/or the one or more circuits is further configured to halt data exchange with the source base station over the second channel within a predetermined time period of the receiving of the RAR message.

17. The UE of claim 16, wherein the predetermined time period is a length of one unit of communication grant time.

18. The UE of claim 16, wherein the processor and/or the one or more circuits is further configured to reconfigure the second radio according to the RAR message, and exchange data with the target base station over the second channel after the reconfiguration of the second radio.

19. The UE of claim 14, wherein the processor and/or the one or more circuits is further configured to exchange control information with the source base station over the first channel for both the first channel and the second channel during the normal operation mode.

20. The UE of claim 19, wherein the processor and/or the one or more circuits is further configured to exchange the control information with the source base station over the second channel for both the first channel and the second channel upon an initiation of the staggered handover.

* * * * *